United States Patent Office 3,804,892
Patented Apr. 16, 1974

3,804,892
NOVEL 3,5-SUBSTITUTED 2,4,6-TRIIODOBENZOIC ACIDS AND SALTS THEREOF
Bjorn Gustav-Adolf Ingelman, Uppsala, Sweden, assignor to Pharmacia AB, Uppsala, Sweden
No Drawing. Original application Dec. 26, 1968, Ser. No. 787,214, now Patent No. 3,632,738, dated Jan. 4, 1972. Divided and this application July 21, 1970, Ser. No. 56,979
Claims priority, application Switzerland, Dec. 28, 1967, 17,897/67
Int. Cl. C07c 103/32
U.S. Cl. 260—519
19 Claims

ABSTRACT OF THE DISCLOSURE

Compounds of the formula:

$$Z \cdot CO \cdot \underset{I}{\underset{|}{C}} \underset{\underset{C}{\underset{\|}{\underset{COOH}{\bigcirc}}}}{\overset{\overset{I}{\underset{|}{C}}}{\bigcirc}} \underset{C \cdot I}{\overset{R_3}{\underset{C \cdot N-A-N \cdot C}{\bigcirc}}} \overset{R'_3}{\underset{\underset{C}{\underset{\|}{\underset{COOH}{\bigcirc}}}}{\overset{\overset{I}{\underset{|}{C}}}{\bigcirc}}} C \cdot CO \cdot Z'$$

wherein Z and Z' each represent a member selected from the group consisting of amino groups of the formula $$—NR_1R_2$$

wherein Z and Z' each represents a member selected from the group consisting of hydrogen and lower alkyl having no more than 5 carbon atoms, and amino groups of the formula $$-N\begin{matrix} R_1 \\ R_2 \end{matrix}$$

wherein $R_1$ and $R_2$ are linked together into a heterocyclic ring system and $R_3$ and $R_3'$ each represents lower acyl having no more than 5 carbon atoms, and wherein A is an alkylene group substituted by at least one substituent of the formula —O—$R_4$, wherein $R_4$ is a member selected from the group consisting of hydrogen, lower alkyl and lower acyl having no more than 5 carbon atoms, said alkylene group containing 3–20 carbon atoms, or physiologically acceptable salts thereof are provided. Such compounds are especially suitable to be used for X-ray visualization of body cavities.

RELATED CASES

This application is a divisional application of our copending U.S. patent application Ser. No. 787,214, filed Dec. 26, 1968 nad now U.S. Pat. 3,632,738.

The present invention relates to novel 3,5-substituted 2,4,6-triiodobenzoic acids adapted to be used for the X-ray visualization of body cavities.

More particularly, the present invention relates to compounds of the formula $$Z \cdot CO \cdot \underset{I}{\underset{|}{C}} \underset{\underset{C}{\underset{\|}{\underset{COOH}{\bigcirc}}}}{\overset{\overset{I}{\underset{|}{C}}}{\bigcirc}} \underset{C \cdot I}{\overset{R_3}{\underset{C \cdot N-A-N \cdot C}{\bigcirc}}} \overset{R'_3}{\underset{\underset{C}{\underset{\|}{\underset{COOH}{\bigcirc}}}}{\overset{\overset{I}{\underset{|}{C}}}{\bigcirc}}} C \cdot CO \cdot Z'$$

wherein Z and Z' each represent an amino group of the formula $$—NR_1R_2$$

wherein $R_1$ and $R_2$ each represent hydrogen or lower alkyl having on more than 5 carbon atoms, or $R_1$ and $R_2$ together with the associated nitrogen atom form members of a heterocyclic ring system, and $R_3$ and $R'_3$ each represent lower acyl having no more than 5 carbon atoms, and A is an alkylene group substituted by one or more substituents of the formula —O—$R_4$, wherein $R_4$ is hydrogen or a lower alkyl or acyl group having no more than 5 carbon atoms, the alkylene group containing 3–20, for example 3–15 carbon atoms and being optionally broken by one or more oxygen bridges, or physiologically acceptable salts thereof. In the above formulas Z and Z' may be the same or different. The former case is the most usual. This also applies to the symbols $R_3$ and $R'_3$.

In a preferred embodiment each nitrogen atom in the bridge $$—\overset{|}{N}—A—\overset{|}{N}—$$

is situated at a distance of two carbon atoms from a group of the formula —O—$R_4$. Preferably no more than one hetetro atom is bound to one and the same carbon atom in the bridge A. (The phrase "a hetero atom" is used to designate an atom other than a carbon or hydrogen atom.) The bridge A suitably contains 3–10 carbon atoms in the alkylene group.

Examples of substituent $R_1$ are hydrogen, methyl or ethyl, of substituent $R_2$ hydrogen, methyl or ethyl and of substituents $R_3$ and $R'_3$ acetyl or propionyl. $R_4$ is preferably chosen in the form of hydrogen when hydrophilic compounds are desired. Consequently, $R_4$ is selected in the form of hydrogen in the majority of the fields of use. When desiring compounds which present more lipophilic properties $R_4$ is selected in the form of lower alkyl or acyl groups, e.g. methyl or ethyl or acetyl or propionyl. Z and Z' may, for instance, each be piperidyl or morpholinyl.

The following are examples of the bridge A in the formulae:

—$CH.CH(OH).CH_2$— or
—$CH_2.CH(OH).CH_2.O.CH_2.CH(OH).CH_2$— or
—$CH_2.CH(OH).CH_2.O.CH_2.CH_2.$
          $O.CH_2.CH(OH).CH_2$— or
—$CH_2.CH(OH).CH_2.O.(CH_2)_4.O.CH_2.CH(OH).CH_2$—
   or $$\overset{CH_3}{|}$$
—$CH_2 \cdot CH(OH) \cdot CH_2 \cdot O \cdot CH \cdot CH_2 \cdot CH_2 \cdot O \cdot CH_2 \cdot CH(OH) \cdot CH_2$—
   or
—$CH_2.CH(OH).CH_2.O.CH_2.CH_2.$
          $O.CH_2.CH_2.O.CH_2.CH(OH).CH_2$— or
—$CH_2.CH(OH).CH_2.O.CH(OH).$
          $CH_2.O.CH_2.CH(OH).CH_2$— or
—$CH_2.CH(OH).CH(OH).CH_2$— or
—$CH_2.CH(OH).CH_2.O.CH_2.CH(OH).CH_2.O.(CH_2)_2.$
     $O.CH_2.CH(OH).CH_2.O.CH_2.CH(OH).CH_2$— or
—$CH_2.CH(OH).CH_2.O.CH_2.CH(OH).CH_2.O.(CH_2)_4.$
        $O.CH_2.CH(OH).CH_2.O.CH_2.CH(O).CH_2$—, or any of the above bridges in which one or more hydroxyl groups are alkylated or acylated with a lower alkyl or acyl group having no more than 5 carbon atoms, e.g. methyl or ethyl or acetyl or propionyl.

Examples of salts of the aforementioned compounds are sodium salts, methylglucamine salts, trishydroxymethyl amino methane salts, or other non-toxic salts. These can be used in the form of an aqueous solution.

Examples of such compounds are:

$$Z \cdot CO \cdot \underset{I}{\underset{|}{C}} \underset{\underset{C}{\underset{\|}{\underset{COOH}{\bigcirc}}}}{\overset{\overset{I}{\underset{|}{C}}}{\bigcirc}} \underset{C \cdot I}{\overset{CH_3}{\underset{C \cdot N-A-N \cdot C}{\bigcirc}}} \overset{CH_3}{\underset{\underset{C}{\underset{\|}{\underset{COOH}{\bigcirc}}}}{\overset{\overset{I}{\underset{|}{C}}}{\bigcirc}}} C \cdot CO \cdot Z'$$

wherein Z and Z' are each an amino group with the formula —NR₁R₂, wherein R₁ and R₂ are each hydrogen or methyl and wherein A is —CH₂.CH(OH).CH₂.O.(CH₂)₄.O.CH₂.CH(OH).CH₂—
or
—CH₂.CH(OH).CH₂.O.(CH₂)₂.O.CH₂.CH(OH).CH₂—
or
—CH₂.CH(OH).CH₂.O.CH(OH).CH₂— or
—CH₂.CH(OH).CH₂.O.CH₂.CH(OH).
CH₂.O.CH₂.CH(OH).CH₂— or
—CH₂.CH(OH).CH(OH).CH₂— or
—CH₂.CH(OH).CH₂—, or any of the above bridges in which one or more hydroxyl groups are alkylated or acylated with a lower alkyl or acyl group having no more than 5 carbon atoms, e.g. methyl or ethyl or acetyl or propionyl, or physiologically acceptable salts thereof, such as sodium salts or methylglucamine salts.

The novel compounds are very useful as X-ray contrast agents. A preparation for carrying out X-ray investigations may conveniently consist of a mixture, such as an aqueous solution, or contain a physiologically acceptable solid carrier, the preparation being preferably in tablet form or in the form of some other suitable dosage unit, said mixture containing one or more of the aforementioned compounds as active contrast-producing substances. The body of the test object to which the preparation has been administered is exposed to X-rays, whereupon photographs are taken or observations made direct on a fluorescent screen or some other conventional X-ray processes are effected in a conventional manner. The dosage of the contrast-producing agent administered to the test object is selected according to the category of investigation, so that a sufficient contrast effect is obtained.

Among those body cavities which can be visualized by the compounds according to the invention or by preparations containing one or more of said compounds is the gastro-intestinal tract. In this instance, the contrast-producing substance is administered perorally in solid form or in solution. The intestines can also be visualized by administering the contrast-producing substance rectally, in the form of an enema. Another example is the visualization of blood vessels, subsequent to the injection of the contrast-producing substance in the form of a sterile solution. Subsequent to being injected intraveneously, the contrast-producing agent is excreted with the urine and enables visibilization of the renal pelvis, ureters and bladders. Further examples are the use of the compounds of the invention in hysterosalpingography, cholangiography, lymphography, urethrography and sialography.

The novel compounds according to the invention present a low toxicity, for instance, when administered intraveneously, and good characteristics as X-ray contrast-producing agents. They also present excellent stability.

Carriers for the novel compounds may be conventional additive substances, such as water with regard to injection solutions and adjuvants when in tablet form.

If the preparation containing a compound according to the invention is in the form of an aqueous solution the concentration of the active compound is selected with respect to the category of use. Preferably a content exceeding 10 grams per 100 ml. of solution is selected. Generally, however, a much higher content is selected, e.g. in the order of 20, 30, 40 or 50 grams or more per 100 ml. of solution.

In accordance with the invention, the aforedescribed novel 3,5-substituted 2,4,6-triiodobenzoic acids can be prepared by reacting a compound of the formula

Y.A.X wherein A has the aforementioned significance, R₄ being preferably hydrogen, and wherein Y and X are each halogen, preferably chloro or bromo, or corresponding epoxide compounds obtainable by splitting off hydrogen halide, with 1 mole of compounds of the formula

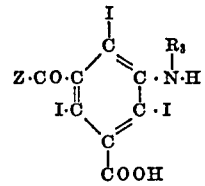

wherein Z and R₃ each have the above significance, or salts thereof, and with 1 mole of compounds of the formula

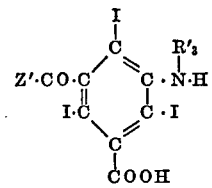

wherein Z' and R'₃ each have the above significance, or salts thereof. The obtained compounds are either recovered as dicarboxylic acids or in the form of physiologically acceptable salts.

Examples of such salts are sodium salts or methylglycamine salts. Sodium and methylglucamine salts have excellent solubility in water.

If R₁ and/or R₂ in Z or Z' is hydrogen, minor quantities of secondary products can be obtained as these hydrogen atoms have a certain but low reactivity. If desired, fomation of such secondary products can be suppressed by selecting mild reaction conditions and an excess of the iodo monocarboxylic acids in relation to the bridge formers. (The excess hereof can be recovered and used in the next batch.) The monocarboxylic acids and said secondary products need not be removed since they are acceptable to the body. If it is preferred to avoid the formation of such secondary products entirely R₁ and R₂ are selected in the form of lower alkyl, e.g. methyl, or R₁ and R₂ together with the associating nitrogen atom are links in a heterocyclic ring system, e.g. piperidyl.

Examples of the bifunctional compounds of the type Y.A.X. or corresponding epoxide compounds obtainable from Y.A.X. by splitting off hydrogen halide are:

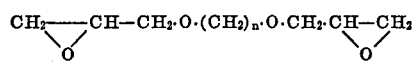

wherein n is an integer from 2 to 4, and

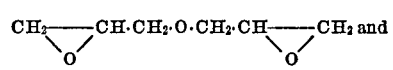

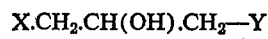

or corresponding halogen hydrins, and bifunctional glycerine derivatives of the formula

X.CH₂.CH(OH).CH₂—Y e.g. dichlorohydrin and dibromohydrin, or corresponding epoxy compounds obtainable by splitting off hydrogen halide and having the formula

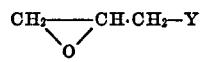

e.g. epichlorohydrin and epibromohydrin. Another example of a similar bifunctional compound is 1,2,3,4-diepoxybutane.

The reaction is preferably carried out in a solvent, e.g. water or an aqueous liquid, and there is suitably added an alkaline reacting substance, e.g. alkali metal hydroxides, the alkaline substance acting as a catalyst. In this manner the alkaline substance can also function as an acceptor for any hydrogen halide liberated during the reaction.

If it is desired to convert one or more hydroxyl groups in the bridge to alkylated or acylated hydroxyl groups the obtained compounds are treated with an alkylating substance or acylating substance, e.g. dimethylsulphate or acetic acid anhydride, in the conventional manner for alkylating or acylating hydroxyl groups.

The reaction can be conducted at different temperatures, e.g. between 0 and 50° C., such as 20° C.

The invention will now be described with reference to the following examples.

Example 1

0.1 mole of 5-acetylamino-2,4,6-triiodo-N-methyl-isophthalic acid monoamide was dissolved in 50 ml. of an aqueous 4 N solution of sodium hydroxide. 0.05 mole of bis-/2,3-epoxypropyl/-ether was added dropwise to the solution whilst stirring, at 20° C. The reaction mixtur was then allowed to stand for 1 day at 20° C., whereafter 6 N HCl was added in an amount sufficient to precipitate the dicarboxylic acid formed in the reaction. The dicarboxylic acid was cleansed by washing with water and reprecipitation, and was dried in vacuum at 50° C. The yield of dicarboxylic acid was approximately 50–60 grams. It is possible to further cleanse the obtained product by repeated dissolution and precipitation processes.

Solutions can be prepared from the obtained acid by adding water and, for instance, equivalent amounts of sodium hydroxide or methylglucamine.

Example 2

0.1 mole of 5-acetylamino-2,4,6-triiodo-N-methyl-isophthalic acid monoamide was dissolved in 50 ml. of an aqueous 4 N solution of sodium hydroxide. 0.05 mole of 1,2-ethanedioldiglycide ether were added to the solution dropwise whilst stirring at 20° C. The reaction mixture was then allowed to stand for one day at 20° C., whereafter 6 N HCl was added in an amount sufficient to precipitate the dicarboxylic acid formed in the reaction. The acid was cleansed by washing with water and reprecipitation, and was dried in vacuum at 50° C. The yield of dicarboxylic acid was approximately 50–60 grams. The obtained product can be further cleansed by repeated dissolution and precipition.

Solutions can be prepared from the obtained acid by adding water and, for instance, equivalent quantities of sodium hydroxide or methylglucamine.

Example 3

0.1 mole of 5-acetylamino-2,4,6-triiodo-N-methyl-isophthalic acid monoamide was dissolved in 50 ml. of an aqueous 4 N solution of sodium hydroxide, 0.05 mole of 1,4-butandioldiglycide ether was added to the mixture dropwise at 20° C. whilst stirring. The reaction mixture was then allowed to stand for one day at 20° C., whereafter 6 N HCl were added in an amount sufficient to precipitate the dicarboxylic acid formed in the reaction. The acid was cleansed by washing and precipitation, and was dried in vacuum at 50° C. The yield of dicarboxylic acid was about 50–60 grams. The obtained product can be further cleansed by repeated dissolution and precipitation.

The obtained acid can be converted into salts, from which aqueous solutions can be prepared similar to what is set forth in Example 1 and Example 2.

Example 4

In a manner similar to that set forth in Example 1, 0.1 mole of 5-acetylamino-2,4,6-triiodo-N-methylisophthalic acid monoamide was reacted with 0.05 mole of epichlorohydrin or with 0.05 mole of epibromohydrin or with 0.05 mole of dichlorohydrin.

The dicarboxylic acid formed in the reaction is cleansed in a manner similar to what is set forth in Example 1.

Example 5

Solutions were prepared from each of the dicarboxylic acids obtained in Examples 1, 2, 3 and 4, in the following manner:

40 grams of substance and equivalent quantities of methylglucamine were dissolved in water to a solution volume of 100 ml. pH was adjusted to 7.3–7.4. The solution was filtered and poured into bottles, which were closed and sterilized in an autoclave.

Example 6

The solutions from Example 5 were injected into the blood vessel of rabbits, whereafter these could be visibilized by X-rays and photographs. X-ray exposure and photographs of the gastro-area showed filling of contrast-producing agent in the renal pelvis, ureters and bladders.

Example 7

Solutions from Example 5 were administered orally to rabbits, whereafter the gastro-intestinal duct was visibilized by X-rays and photographs, with excellent results.

Example 8

Solutions of sodium salt of the compounds prepared in a manner similar to what is set forth in Example 5 and containing 20 grams of dicarboxylic acids per 100 ml. of solution were administered in the form of an enema to rabbits, whereafter the intestines were visibilized by X-rays and photographs, with good results.

What I claim is:

1. A compound selected from the group consisting of (1) compounds of the formula

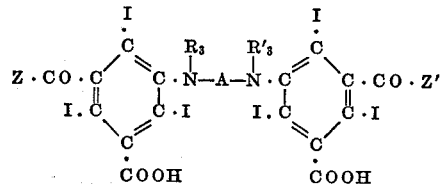

wherein Z and Z' each represent a member selected from the group consisting of amino groups of the formula $$-NR_1R_2$$

wherein $R_1$ and $R_2$ each represent a member selected from the group consisting of hydrogen and alkyl having no more than 5 carbon atoms, and $R_3$ and $R'_3$ each represent lower alkanoyl having no more than 5 carbon atoms, and wherein A is an alkylene group substituted by at least one substituent of the formula $-OR_4$, wherein $R_4$ is a member selected from the group consisting of hydrogen and lower alkyl having no more than 5 carbon atoms; said alkylene group containing 3–20 carbon atoms, and (2) physiologically acceptable salts thereof.

2. A compound as claimed in claim 1, wherein each nitrogen atom in the bridge

is situated at a distance of 2 carbon atoms from a group $-OR_4$, and wherein at the most one hetero atom is bound to one and the same carbon atom in the bridge A.

3. A compound as claimed in claim 1, wherein the bridge A is a member selected from the group consisting of $$-CH_2.CH(OH).CH_2-;$$

$$-CH_2.CH(OH).CH(OH).CH_2-$$

and the aforesaid bridge in which at least one hydroxy group is alkylated with a lower alkyl group having no more than 5 carbon atoms.

4. A compound as claimed in claim 1, wherein Z and Z' are each an amino group of the formula $-NR_1R_2$, wherein $R_1$ and $R_2$ are each a member selected from the group consisting of hydrogen, methyl and ethyl and $R_3$ and $R'_3$ are each a member selected from the group consisting of acetyl and propionyl, and $R_4$ is a member selected from the group consisting of hydrogen, methyl, and ethyl.

5. A compound as claimed in claim 1 wherein $R_1$ and $R_2$ each represent methyl, $R_3$ and $R'_3$ each represent acetyl, and $R_4$ is hydrogen.

6. A compound selected from the group consisting of (1) compounds of the formula

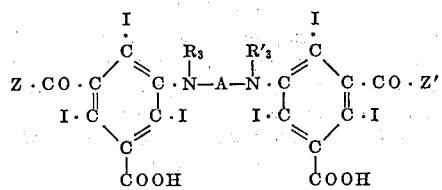

wherein Z and Z' each represent a member selected from the group consisting of amino groups of the formula $$-NR_1R_2$$

wherein $R_1$ and $R_2$ each represent a member selected from the group consisting of hydrogen and alkyl having no more than 5 carbon atoms, and $R_3$ and $R'_3$ each represent lower alkanoyl having no more than 5 carbon atoms, and wherein A is an alkylene group substituted by at least one substituent of the formula $-OR_4$, wherein $R_4$ is a member selected from the group consisting of hydrogen and lower alkyl having no more than 5 carbon atoms; said alkylene group containing 3–20 carbon atoms and being broken by at least one oxygen bridge, and (2) physiologically acceptable salts thereof.

7. A compound as claimed in claim 6, wherein each nitrogen atom in the bridge

is situated at a distance of 2 carbon atoms from a group $-OR_4$ and wherein at the most one hetero atoms is bound to one and the same carbon atom in the bridge A.

8. A compound as claimed in claim 6, wherein the bridge A is a member selected from the group consisting of $-CH_2.CH(OH).CH_2O.(CH_2)_4.O.CH_2.CH(OH).CH_2-$;
$-CH_2.CH(OH).CH_2.O.(CH_2)_2.O.CH_2.CH(OH).CH_2-$;
$-CH_2CH(OH).CH_2O.CH_2.CH(OH).CH_2-$;
$-CH_2.CH(OH).CH_2.O.CH_2.CH(OH).CH_2.O.CH_2.CH(OH).CH_2-$;
$-CH_2.CH(OH).CH_2.O.CH_2.CH(OH).CH_2.O.(CH_2)_2.O.CH_2.CH(OH).CH_2.O.CH_2.CH(OH).CH_2-$;
$-CH_2.CH(OH).CH_2.O.CH_2CH(OH).CH_2.O.(CH_2)_4.O.CH_2CH(OH).CH.O.CH_2.CH(OH).CH_2-$;

and the aforesaid bridges in which at least one hydroxyl group is alkylated with lower alkyl having no more than 5 carbon atoms.

9. A compound as claimed in claim 6, wherein Z and Z' are each an amino group of the formula $$-NR_1R_2$$

wherein $R_1$ and $R_2$ are each a member selected from the group consisting of hydrogen, methyl and ethyl and $R_3$ and $R'_3$ are each a member selected from the group consisting of acetyl and propionyl and $R_4$ is a member selected from the group consisting of hydrogen, methyl, and ethyl.

10. A compound as claimed in claim 6 wherein $R_1$ and $R_2$ each represent methyl, $R_3$ and $R'_3$ each represent acetyl, and $R_4$ is hydrogen.

11. A compound selected from the group consisting of (1) compounds of the formula

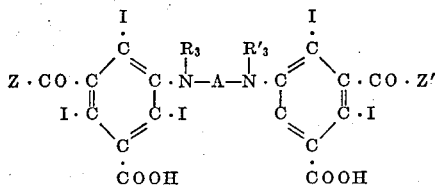

wherein Z and Z' each represent a member selected from the group consisting of amino groups of the formula $$-NR_1R_2$$

wherein $R_1$ and $R_2$ each represent a member selected from the group consisting of hydrogen and alkyl having no more than 5 carbon atoms, and $R_3$ and $R'_3$ each represent alkanoyl having no more than 5 carbon atoms, and wherein A is an alkylene group substituted by at least one substituent of the formula $-OR_4$, and wherein $R_4$ is a member selected from the group consisting of hydrogen and lower alkyl having no more than 5 carbon atoms, said alkylene group containing 3–10 carbon atoms, and (2) physiologically acceptable salts thereof.

12. A compound as claimed in claim 11, wherein each nitrogen atom in the bridge

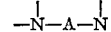

is situated at a distance of 2 carbon atoms from a group $-OR_4$, and wherein at the most one hetero atom is bound to one and the same carbon atoms in the bridge A.

13. A compound as claimed in claim 11 wherein $R_1$ and $R_2$ each represent methyl, $R_3$ and $R'_3$ each represent acetyl, and $R_4$ is hydrogen.

14. A compound as claimed in claim 11, wherein Z and Z' are each an amino group of the formula $-NR_1R_2$, wherein $R_1$ and $R_2$ are each a member selected from the group consisting of hydrogen, methyl and ethyl and $R_3$ is a member selected from the group consisting of acetyl and propionyl, and $R_4$ is a member selected from the group consisting of hydrogen, methyl, and ethyl.

15. A compound selected from the group consisting of (1) compounds of the formula

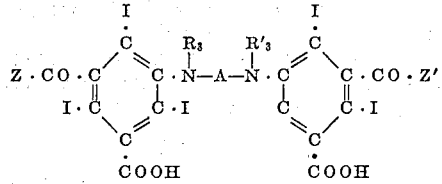

wherein Z and Z' each represent a member selected from the group consisting of amino groups of the formula $$-NR_1R_2$$

wherein $R_1$ and $R_2$ each represent a member selected from the group consisting of hydrogen and alkyl having no more than 5 carbon atoms, and $R_3$ and $R'_3$ each represent alkenoyl having no more than 5 carbon atoms, and wherein A is an alkylene group substituted by at least one substituent of the formula $-OR_4$, wherein $R_4$ is a member selected from the group consisting of hydrogen and lower alkyl having no more than 5 carbon atoms, said alkylene group containing 3–10 carbon atoms and being broken by at least one oxygen bridge, and (2) physiologically acceptable salts thereof.

16. A compound as claimed in claim 15, wherein each nitrogen atom in the bridge

is situated at a distance of 2 carbon atoms from a group $-OR_4$ and wherein at the most one hetero atom is bound to one and the same carbon atom in the bridge A.

17. A compound as claimed in claim 15, wherein the bridge A is a member selected from the group consisting of —$CH_2.CH(OH).CH_2.O.(CH_2)_4.O.CH_2.CH(OH).CH_2$—;
—$CH_2.CH(OH).CH_2.O.(CH_2)_2.O.CH_2.CH(OH).CH_2$—;
—$CH_2.CH(OH).CH_2.O.CH_2.CH(OH).CH_2$—;
—$CH_2.CH(OH).CH_2.O.CH_2.CH(OH).CH_2.O.CH_2.CH(OH).CH_2$—;

and the aforesaid bridges in which at least one hydroxy group is alkylated with lower alkyl having no more than 5 carbon atoms.

18. A compound as claimed in claim 15, wherein Z and Z' are each an amino group of formula $$-NR_1R_2$$

wherein $R_1$ and $R_2$ are each a member selected from the group consisting of hydrogen; methyl; and ethyl and $R_3$ and $R'_3$ are each a member selected from the group consisting of acetyl and propionyl and $R_4$ is a member selected from the group consisting of hydrogen; methyl; and ethyl.

19. A compound as claimed in claim 15 wherein $R_1$ and $R_2$ each represent methyl, $R_3$ and $R'_3$ each represent acetyl, and $R_4$ is hydrogen.

References Cited
UNITED STATES PATENTS
3,542,861  11/1970  Ackerman _____ 260—519

LORRAINE A. WEINBERGER, Primary Examiner

L. A. THAXTON, Assistant Examiner

U.S. Cl. X.R.

260—247.2, 293.77, 490, 501.11; 424—5

UNITED STATES PATENT OFFICE
CERTIFICATE OF CORRECTION

Patent No. 3,804,892    Dated April 16, 1974

Inventor(s) BJORN GUSTAV-ADOLF INGELMAN

It is certified that error appears in the above-identified patent and that said Letters Patent are hereby corrected as shown below:

Column 1, line 9, delete "Switzerland" and insert ---Sweden---.

Claim 11, Column 8 the formula should be:

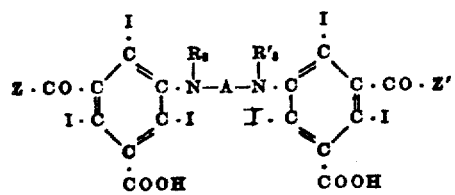

Claim 15, Column 8 the formula should be:

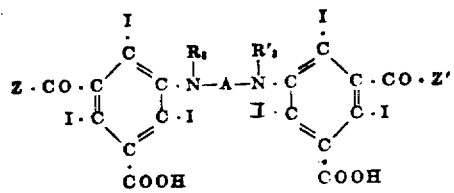

In Claims 2, 7, 12 and 16 the formula should be

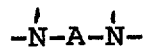

Signed and sealed this 26th day of November 1974.

(SEAL)
Attest:

McCOY M. GIBSON JR.    C. MARSHALL DANN
Attesting Officer    Commissioner of Patents